Nov. 18, 1941.   H. N. MACPHERSON   2,263,182

WOOD STAVE PIPE

Filed Jan. 30, 1940

INVENTOR.
HAROLD NOLAN MACPHERSON.

*Ernest E Carver*
ATTORNEY.

Patented Nov. 18, 1941

2,263,182

UNITED STATES PATENT OFFICE 2,263,182

WOOD STAVE PIPE

Harold Nolan Macpherson, Vancouver, British Columbia, Canada

Application January 30, 1940, Serial No. 316,361

1 Claim. (Cl. 138—79)

My invention relates to improvements in wood stave pipe which is particularly adapted for culverts, sewers and other similar purposes and is designed to withstand external pressures.

The object of the invention is to provide a pipe oval in cross section which is capable of remaining tight even though it is deformed by settlement of the surrounding fill or by accumulative stress set up by traffic passing transversely over the pipe. A further object is to provide means for binding the staves of the oval pipe whereby adjacent staves will not buckle due to binding strain.

The invention consists essentially of an oval pipe made up of staves having complementary tongues and grooves and supported in position by substantially rigid encircling bands, as will be more fully described in the following specification and shown in the accompanying drawing, in which.

In the drawing like characters of reference indicate corresponding parts in each figure.

Figure 1:
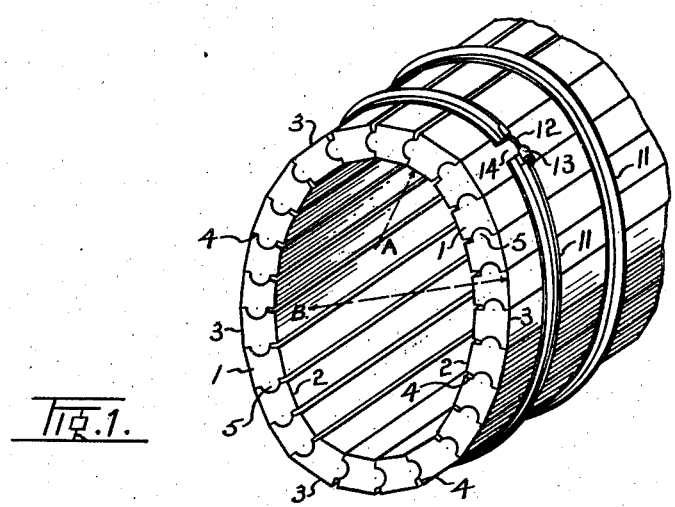
Fig. 1 is a perspective view of an oval pipe made up of standard staves.

The numeral 1 indicates a plurality of staves arranged in side by side relation, each of which has an inner face 2, an outer face 3 and side edges 4. One side edge consists of a substantially semi-circular tongue 5 and an inner and an outer marginal edge portion or haunch respectively indicated by the numerals 6 and 7, whereas the opposite side edge is provided with a substantially semi-circular groove 8 and inner and outer marginal edge portions or haunches 9 and 10 respectively. The inner marginal edge portions 6 and 9 are set in the embodiments illustrated to intersect a centre at a given radius as at A, see Figure 1, and the outer marginal edge portions 7 and 10 are set to intersect a centre at a larger radius as at B, so that in a pipe, if desired, may be designed to an oval having two definite radii, such as in Figure 1, the adjacent inner marginal edges will be in contact at the top and bottom of the pipe and the outer marginal edges will be in contact at the sides.

The staves are set up in position within a plurality of bands 11, which are preferably formed of a T section and provided at one of their adjacent ends with a bolt 12 and at the other with an eye 13 to serve to contract the gap 14 between said ends and tighten the band around the pipe. The gap 14 or the joint of the band 11 is disposed at a point approximately midway between the vertical and horizontal axis of the pipe, as these four points are the places where the minimum distortion of the periphery of the pipe takes place when the pipe generally is distorted incidental to top loading or other deforming strain.

The above mentioned placing of the gap of the band permits alternate bands to be reversed, so that the gaps are staggered and creasing of adjacent staves is definitely prevented.

Figure 2:
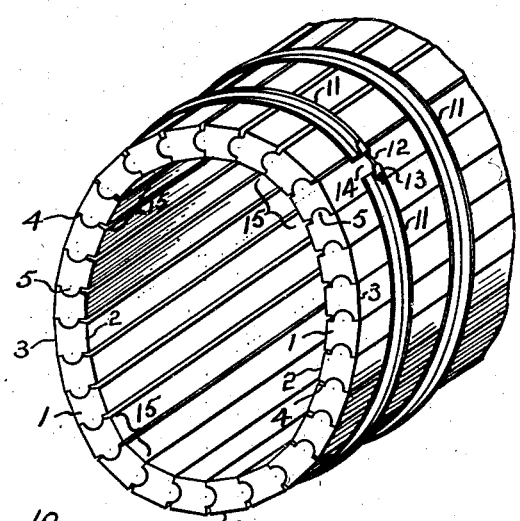
Fig. 2 is a perspective view of an oval pipe of modified section and made up of similar staves.
Figure 3:
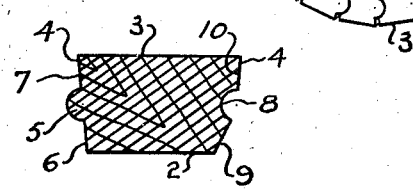
Fig. 3 is a sectional view of the preferred stave.

In the modified form of pipe shown in Figure 2, the section is not drawn to definite radii but two or more adjacent staves 15 on the sides of the pipe are so disposed with relation to each other that the joint between said staves is entirely carried on the tongue 5 and the groove 8 and neither complementary inner or outer edges of adjacent staves meet.

It will be obvious that an oval pipe may be made up with staves having a semi-circular tongue and a corresponding groove only, provided the necessary support were provided for the pipe in increasing the number or the strength of the bands.

It will be apparent that if the fill and top loading is excessive, or that the sides of the pipe are insufficiently buttressed in filling in the earth around it, that deformation will take place, in which case the horizontal axis of the pipe will be spread until the arch and inverted arch of the pipe has assumed its requisite curvature. The spreading of the horizontal axis will cause adjacent inner edge portions 6 and 9 near said axis, to approach each other, and if the distortion is great the outer edge portions 7 and 10 near the vertical axis may tend to close, but the pipe will not collapse or leak.

What I claim as my invention is:

An oval pipe consisting of longitudinally disposed wood staves each having side edges, one of said side edges being provided with a substantially semi-circular tongue bordered by inner and outer side edge portions, and the other side edge being provided with a complementary groove bordered by inner and outer side edge portions, the angle between the inner side edge portions being greater than the angle between the outer side edge portions, whereby gaps are formed between adjacent outer side edge portions adjacent the major axis of the pipe and other gaps are formed between adjacent inner side edge portions adjacent the minor axis of the pipe, said staves being bound together in side by side relation with substantially rigid bands spaced longitudinally of the pipe, each of said bands being formed of a strip of material bent C shape and having fastening means connecting the free ends, said fastening means being so disposed with respect to the band as to lie substantially at the intersection of adjacent staves between which a gap is formed between inner side edge portions, and adjacent staves between which a gap is formed between outer side edge portions.

HAROLD NOLAN MACPHERSON.